United States Patent
Wilson et al.

(10) Patent No.: US 7,935,874 B2
(45) Date of Patent: May 3, 2011

(54) ENHANCING YIELDS OF HARVESTED PLANT SEEDS BY TREATING SOWING SEEDS WITH SELECTED DOSES OF A PHYSICAL PLANT STRESSOR

(75) Inventors: Charles L. Wilson, Sheperdstown, WV (US); Glenn Frederick Heidinger, Jacksonville, IL (US)

(73) Assignee: Horizon Seed Technologies, Inc., Jacksonville, IL (US)

( * ) Notice: Subject to any disclaimer, the term of this patent is extended or adjusted under 35 U.S.C. 154(b) by 0 days.

(21) Appl. No.: 12/840,990

(22) Filed: Jul. 21, 2010

(65) Prior Publication Data

US 2010/0281772 A1 Nov. 11, 2010

Related U.S. Application Data

(62) Division of application No. 12/357,760, filed on Jan. 22, 2009.

(60) Provisional application No. 61/031,391, filed on Feb. 26, 2008.

(51) Int. Cl.
*A01H 5/00* (2006.01)
(52) U.S. Cl. .................................................. 800/320.1
(58) Field of Classification Search ........................ None
See application file for complete search history.

(56) References Cited

U.S. PATENT DOCUMENTS

| 5,040,329 | A | 8/1991 | Michaloski |
| 5,104,437 | A | 4/1992 | Hadwiger |
| 5,364,645 | A | 11/1994 | Lagunas-Solar et al. |
| 6,333,302 | B1 | 12/2001 | Beer et al. |
| 7,005,263 | B1 | 2/2006 | Steimer et al. |
| 7,132,525 | B2 | 11/2006 | Laby et al. |
| 2002/0103083 | A1 | 8/2002 | Harman |
| 2003/0044311 | A1 | 3/2003 | Sousa et al. |
| 2006/0016125 | A1 | 1/2006 | Krauss et al. |
| 2008/0072494 | A1 | 3/2008 | Stoner et al. |

FOREIGN PATENT DOCUMENTS

| JP | 2000-050706 | 2/2000 |
| SU | 961582 | 9/1982 |
| WO | WO 2007/049962 | 5/2007 |

OTHER PUBLICATIONS

International Search report issued in application No. PCT/US10/21560 (2010).
Brown et al., "The effect of low dose ultraviolet light-C seed treatment on induced resistance in cabbage to black rot (*Xanthomonas campestris pv. campestris*)," *Crop Protection*, 20: 873-883 (2001).
Gisenko et al., "Effect of Seed Irradiation on Plant Resistance of Root and Stern Rot" 607-610.
Heil at al., "Reduced growth and seed set following chemical induction of pathogen defence: does systemic acquired resistance (SAR) incur allocation costs?," *Journal of Ecology*, 88 (4): (2000) (Abstract).
Shama et al., "UV hormesis in fruits: a concept ripe for commercialisation," *Trends in Fod Science & Technology*, 16: 128-136 (2005).
Vallad et al., "Review & Interpretation: Systemic Acquired Resistance and Induced Systemic Resistance in Conventional Agriculture," *Crop Sci.*, 44: 1920-1934 (2004).
Wilson et al., "Potential of Induced Resistance to Control Postharvest Diseases of Fruits and Vegetables," *Plant Disease*, 78 (9): 837-844 (1994).

*Primary Examiner* — Wendy Haas
(74) *Attorney, Agent, or Firm* — Barnes & Thornburg LLP; Alice O. Martin

(57) ABSTRACT

The present invention relates to a method of enhancing the yield of harvested seed in plants by the application of selected doses of a physical plant stressor such as UV-C light (253.7 nm), X-rays, gamma ray, and electron beam irradiation to sowing seeds. This method can be used alone to enhance seed yield or in combination with standard seed treatments.

1 Claim, No Drawings

ENHANCING YIELDS OF HARVESTED PLANT SEEDS BY TREATING SOWING SEEDS WITH SELECTED DOSES OF A PHYSICAL PLANT STRESSOR

This application is a Divisional of co-pending U.S. patent application Ser. No. 12/357,760, filed Jan. 22, 2009, which claims the benefit of U.S. Provisional Patent Application No. 61/031,391 filed Feb. 26, 2008, the contents of which applications are herein incorporated by reference in their entireties.

FIELD OF THE INVENTION

The present invention relates to methods of enhancing the yield of harvested plant seeds by the treatment of plant sowing seeds with select doses of a physical stressor such as UV-C light, X-rays, gamma ray, and electron beam irradiation.

BACKGROUND

The following definitions apply to descriptions used in the specification of this invention:

UV-C—is light at the wave-length of 253.7 nm.

Seed—(in some plants referred to as a kernel) is a small embryonic plant enclosed in a covering called a seed coat with some stored food. Seed also has a general meaning that predates the above when it refers to anything that can be sown such as a seed potato that consists of a piece of a tuber.

Harvested Seed—is seed gathered from a crop when it is ripe for consumption.

Sowing Seed—is seed that is dispersed over or under the ground or other growth medium to produce a crop. Sowing seed is often treated with a coating of a pesticide to reduce root rots and insect infestation.

Hormesis—(from the Greek word hormein meaning to "excite") describes a principle whereby a generally-favorable biological response occurs to low exposures of a stressor. A stressor eliciting hormesis thus has the opposite effect in small doses than in large doses. Something capable of exciting the favorable response is called a hormetin. In this invention the hormetin used is UV-C light.

Disinfest (disinfestation)—is the process of removal or inactivation of pests (plant pathogens and insects) from plant surfaces.

Disinfect (disinfection)—is the process of killing microorganism (fungi and bacteria) that have infected (established a food relationship) within plant tissue.

The application of low doses of UV-C light has been used to induce a hormetic response in harvested commodities such as apple, citrus, and carrots. It has been found that low doses of UV-C light (a stressor) elicits a resistance response in a wide variety of fruits and vegetables to postharvest decay. It also delays fruit and vegetable ripening (Wilson et al. 1994, Plant Disease 78: 837-884).

Only recently has it been found that low doses of UV-C light can elicit a hormetic response in seeds that translates into a positive response in the fully developed plant. Cabbage seeds subjected to a critical low dose of UV-C light (3.6 kJ/M$^2$) produced plants with more desirable color, greater weight, larger head diameter, and resistance to black rot disease (Brown et al. 2001, Crop Protection 20: 873-883). However, Brown et al. (2001) did not investigate the effect of irradiating cabbage sowing seed on harvested cabbage seed.

Gisenko and Mazhara (1968, Tr. Ves. Soveshch. Immuitetu. Rast. 2: 21-24) found that low doses of gamma rays, X-rays, or UV-C light irradiation applied to sowing corn seed increased disease resistance to stalk and root rots in the mature plant. Gisenko and Mazhara (1968) did not report on the effect of hormetic doses of gamma ray, X-rays, or UV-C light irradiation on yields of harvested corn kernels. Neither Brown et al. (2001) nor Gisenko and Mazhara (1968) used chemical seed pesticides (fungicides and insecticides) over-treatments in combination with a hormetic stressor on their irradiation treated seed.

Seed crop yields are dependent on a multitude of environmental factors and the genetic response of the plant to these factors. In general, conditions optimum for plant growth and development would not be expected to be optimum for seed production, which has its own set of optimum environmental and biological factors such as conditions for pollination.

The growth and reproduction of the plant is dependent on abiotic (physical) and biotic (biological) factors. Abiotic factors include the physical environmental conditions and biotic factors include animals, insects, and diseases. Each plant has certain environmental requirements for optimum growth including temperature, light, moisture, growth medium, and fertilization. Suboptimum conditions for any of these factors can result in reduced plant growth and/or reduced harvested seed yields.

Plants are also subjected to a variety of insect and disease pests for which they have varying degrees of genetic resistance. Plant breeders in developing resistance to pathogens and other pests have relied on the use of single resistance genes. Plants with the ability to resist infection by a particular pathogen are referred to as "resistant" to that pathogen. Pathogens lacking the ability to attack a particular plant are referred as "avirulent" to that plant. Unfortunately, pathogens are continually evolving strains that defeat the resistance genes deployed in crop plants by plant breeders. This has resulted in an unending "merry-go-round" of gene replacements for resistance that have been defeated by pathogens. More recently, Genetically Modified Organisms (GMO) technology is relying on the insertion of specific genes into plants for specific pest or herbicide resistance.

Synthetic pesticides are also used extensively to control plant pests. Because of concerns for safety to man and the environment, considerable opposition is being expressed to both GMOs and synthetic pesticides. This has created a demand for "greener" technologies that are less harmful to man and the environment. The present invention helps address the need for a more sustainable resistance in plants to pests. There are indications that it may provide an alternative to synthetic pesticides and consequently a reduction in the use of synthetic pesticides.

Seed treatments used to control plant diseases and insects can be divided into chemical, biological, and physical treatments. Irradiation treatments such as those described in this invention are physical seed treatments. Among the physical treatments are hot water, hot air, UV-C light, X-rays, gamma ray, and electron beam irradiation. Prior to this invention, except for the physical seed treatment investigations cited above, physical seed treatments have been used to disinfest and/or disinfect seeds from plant pathogens and insects.

It is known that certain chemicals applied to seeds will increase plant growth and enhance resistance responses in plants to pests. Hadwiger (U.S. Pat. No. 5,104,437) describes the use of the natural compound chitin applied to seeds to control root rotting organisms. Harman (U.S. Patent Publication No. 2002/0103083 A1) discloses a method of promoting deeper root development, reducing nitrogen usage in plants, and imparting drought resistance by the application of a fungus *Trichoderma harzianium* to plant seeds. Laby et al. (U.S. Pat. No. 7,132,525 B2) discloses fragments of an elicitor protein from *Erwinia* sp. that can be applied to plant seeds to elicit a hypersensitive resistance response and render plants resistant to insects. Stoner (U.S. Patent Publication No. 2008/0072494 A1) discloses a chemical elicitor combination that can be applied to seeds that contains chitosan and various micronutrients for controlling nematodes.

UV-C light and other physical stressors such as gamma ray irradiation and X-rays are known to elicit resistance responses in plants to pests. Enhanced plant pest resistance caused by elicitors of host defense such as UV-C light is thought to be caused partially by the "turn on" of Systemically Acquired Resistance ("SAR") in the host plant (Vallad, G. E. and R. M. Goodman 2004, Crop Sci. 44: 1920-1934). Heil et al. (2001, Journal of Ecology 88: 645-654) found that when SAR was "turned on" in *Triticum aestivum* by an elicitor, plants developed fewer shoots and ears and thereby produced fewer seeds. It was expected that treating sowing seed of corn and soybeans with UV-C light in the present invention would result in enhanced resistance to pests, but because of the work of Heil et al. (2001) it was anticipated that the energy expended in "turning on" host resistance responses by UV-C light would result in reduced yields of harvested seed.

SUMMARY OF THE INVENTION

The present invention comprises a method of increasing the yield of harvested seed by the treatment of sowing seeds with UV-C light or other physical stressors and by the treatment of sowing seeds with UV-C light or other physical stressors followed by an over-treatment with a chemical pesticide(s). The increased yield in harvested seed is thought to be produced in large part by a hormetic response elicited by UV-C light along with disinfestation and disinfection of pests associated with the seed.

DETAILED DESCRIPTION OF THE INVENTION

It was discovered as described in this invention that the treatment of soybean sowing seeds with a single treatment of a selected dose of a hormetin (UV-C light) in the range of 0.25-480 kJ/M$^2$ resulted in increased yield of harvested seeds (Examples 3 and 4). Example 4 shows that the three best of seven sowing soybean seed treatments with UV-C light and no chemical over-treatment resulted in an average yield improvement of 2.5 bushels per acre or 3.9 percent over the control. Soybean Variety #2, which responded best to the UV-C light treatment without chemical over-treatment, showed an average 5.9 bushels per acre or 9.8 percent improvement in yield over the control. Previous studies with seeds (Brown et al. 2001, Crop Protection 20: 873-883) reported doses of UV-C light that elicited hormetic responses at a much lower and restrictive range than the ranges we disclose in this invention.

It was also discovered as described in this invention that the treatment of corn and soybean sowing seeds with a single treatment of a selected dose of a hormetin (UV-C light) in the range of 0.25-480 kJ/M$^2$ followed by commonly used chemical pesticide(s) as an over-treatment resulted in increased yields of harvested seed from these crops (Examples 1, 2, 5, and 6). Example 1 shows an average 11.2 bushels per acre or 5.3% improvement in harvested corn yields from 3 different UV-C light treatments with chemical over-treatment on 2 different hybrids over the control. Example 2 shows an average 13.2 bushels per acre or 11.1% improvement in yield of a single corn inbred over the control from a single treatment of UV-C light with chemical over-treatment. Example 5 shows an average 2.2 bushels per acre or 3.5% improvement in soybean yield over the control for 7 different UV-C light treatments with chemical over-treatment on 3 different varieties. And lastly, Example 6 shows an average 4.7 bushels per acre or 7.5% improvement in yield over the control for the 3 best UV-C light treatments for each of the 3 soybean varieties. The three best selected treatments of UV-C light for Soybean Variety #2 showed the best response with an average yield improvement of 5.6 bushels per acre or 9.2% over the control.

For multiple reasons, it was not expected that a single physical sowing seed treatment with a stressor such as UV-C light would increase the yield of harvested seed. With the multiplicity of environmental and genetic factors required to increase harvested seed yield it would be unexpected that a single physical treatment would increase the yield of harvested seed.

Abnormal amounts of a physical stressor such as heat, cold, wetness, or dryness to growing seed crops results in harvested seed yields below the normal. With the normal amount of UV-C light in the environment being negligible, it would be reasonable to anticipate that any dose of UV-C light would be an abnormal amount of a physical stressor to sowing seeds which would result in lower than normal yield of the harvested seed.

And finally, it has also been found that the energy expended by plants in response to an elicitor of host defenses may actually lead to reduced yields of harvested seed by the plant (Heil et al. 2001, Journal of Ecology 88: 645-654). The "fitness costs" that are entailed when resistance is induced in plants led us to expect reduced yields of harvested seed from the treatment of sowing seeds of corn and soybeans with the elicitor of host resistance UV-C light. We unexpectedly found that such treatments actually enhanced the yield of harvested seed. Our ability to enhance the yield of harvested seed of corn and soybeans by the treatment of sowing seeds with selected doses of UV-C light is unique and sets us apart from the previous art in the field. It is noteworthy too, that the doses we used came from a range of UV-C light that is much higher than the range of UV-C light doses reported by other investigations.

We were able to enhance the yield of harvested seed of corn and soybeans by treating sowing seeds with selected doses of UV-C light in a range much higher (0.25-480 kJ/M$^2$) than those reported by previous investigators. This suggests to us that our UV-C light treatments may have additional positive effects other than just hormesis. Among these effects may be disinfestation and disinfection of the seed.

Crop seeds are often treated with synthetic pesticides (fungicides and insecticides) to control root rots and insect infestations. Such treatments often increase crop yields through the control of these pests. Neither Brown et al. (2001) nor Gisenko and Mazhara (1968) used chemical seed pesticide over-treatment in combination with their irradiation treated seed. We found, as shown in this invention, that treatment of sowing soybean and corn seeds with selected doses of UV-C light and then over-treating the seeds with chemical pesticides can significantly increase the production of harvested corn and soybean seeds, as compared to yields without the UV-C light treatment, but with the same chemical pesticides. Because the hormetic response elicited by UV-C light appears to be highly conserved in plants and results in enhanced yield of harvested seed, it can be anticipated that this invention may be applicable to a wide variety of additional seed crop species that customarily use chemical seed treatments. Also, this invention may be applicable to additional seed crop species that currently do not customarily use chemical seed treatments.

For sowing corn seed the chemical over-treatments used in our tests were Maxim XL, Apron XL, and Trilex. For sowing soybean seed the chemical over-treatment used in our tests was Apron Maxx. Apron Maxx, Apron XL and Maxim XL are fungicides produced by Syngenta and Trilex is a fungicide produced by Bayer Crop Science.

Besides UV-C light, selected treatments of other physical stressors are expected to yield the hormetic response in sowing seeds and in turn enhance harvested seed yields. Among these are gamma ray irradiation, X-rays, and high and low energy electrons, heat, and pressure. This is not to exclude selected treatments of other potential physical agents or other physical agents with chemical over-treatments that may induce the hormetic response in sowing seeds and in turn enhance harvested seed yields. Nor, additional unexpected responses from the treatment of sowing seed with other potential hormetic agents.

The effectiveness of UV-C light in enhancing seed yields that are controlled by a multiplicity of factors may reside in the multiple effects of UV-C light irradiation on plants. UV-C light is known to elicit host resistance in plants to pests. Also, we were able to demonstrate that UV-C light was able to disinfest the surface of corn and soybean seeds, as well as, disinfect internal infections of *Fusarium* sp. in these seeds. This multifaceted action of UV-C light probably accounts for our unexpected findings that a single treatment of UV-C light of sowing seeds resulted in enhanced yields of harvested seeds.

Previous research on the induction of postharvest decay resistance by UV-C light in harvested fruit has demonstrated that optimum doses for eliciting the hormetic response in these commodities were in the range of 0.25-7.5 $kJ/M^2$ (Shama and Alderson 2005, Trends in Food Science & Technology 16: 128-136). Brown et al. (2001, Crop Protection 20: 873-883) found that the optimum dose to elicit the hormetic response in cabbage was 3.6 $kJ/M^2$. We found unexpectedly in our research that select treatments of UV-C light from within a wider range of UV-C light doses from 0.25-480 $kJ/M^2$ applied to sowing corn and soybean seeds resulted in enhanced yields of harvested corn and soybean seed. Such increases in yield may not be attributable solely to hormesis, but may involve disinfestation and disinfection of the seed, as well as, other unknown factors. Other doses of UV-C light outside the range of 0.25-480 $kJ/M^2$ that may enhance the yield of harvested seed are within the scope of this invention.

Because of concerns for safety to man and the environment, considerable opposition is being expressed to both GMOs and synthetic pesticides. This has created a demand for "greener" technologies that are less harmful to man and the environment. Since our UV-C light treatment is a physical treatment and since we had positive yield results in soybeans that were sowed with UV-C light treatment and without synthetic pesticides, this invention provides a "green" alternative for enhancing harvested seed yield. Example 4 shows that the three best of seven sowing soybean seed treatments with UV-C light and no chemical over-treatment resulted in an average yield improvement of 2.5 bushels per acre or 3.9 percent over the control. Variety #2, which responded best to the UV-C light treatment without chemical over-treatment, showed an average 5.9 bushels per acre or 9.8 percent improvement in yield over the control.

One embodiment of this invention is the combined use of a selected plant physical stressor to induce the hormetic response in sowing seeds with the use of conventional chemical seed treatments. Such combinations are expected to yield additive and/or synergistic responses to plant pests and environmental stress that will result in enhanced harvested seed yield.

A second embodiment of this invention is the use of a selected physical plant stressor to induce the hormetic response in sowing seeds without the use of conventional chemical seed treatments, which provides a new "greener" technology that will result in enhanced harvested seed yield.

Another embodiment of this invention is the disinfestation of plant seed surfaces with UV-C light irradiation. Such disinfestation can result in depressed disease development by seedborne pathogens, insects, and nematodes. Also, the combined action of a hormesis response in the seed with disinfestation can result in additive and/or synergistic resistance of the plant to pests and environmental stress.

Among the seeds where treatment of sowing seeds with a physical plant stressor such as UV-C light may lead to enhancement of harvested seed yields are the approximately 35,000 plant seeds of the world including corn, soybeans, wheat, rice, cotton, peanuts, vegetable seeds, flower seeds, grass seeds, forest tree seeds, and nuts. Among the beans are chickpeas, cowpeas, dry beans, fava beans, lablab, lentils, lupines, peas, pigeon peas, velvet beans, vetch, winged beans, yam beans, and tonica beans. Among the cereals are barley, fonio, kamut, maize (corn), pearl millet, oats, palmer's grass, rye, sorghum, spelt, teff, triticale, breadnut, buckwheat, cattail, chia, cockscomb grain armaranth, kaniwa, pitseed goosefoot, quinan, and wattlesseed, Among the nuts are almond, beech, butternut, brazil nut, candlenut, cashew, chestnuts, colocynth, filbert, hickory, pecan, Indian beech, kola nut, macadamia, mamoncillo, maya nut, mongonogo, oak acorns, ogbono nut, paradikse nut, walnut, water caltrop. Among the nut-like gymnosperm seed are cycads, gingo, juniper, monkey-puzzle, pine nuts, and podocarps. Also included are alfalfa, red clover, flax, rapeseed, sugarcane, sugar beets, canola, cempedak, durian, equsi, fluted pumpkin, hemp seed, jackfruit, lotus seed, malaboar, gourd, pistachio, pumpkin seed, sunflower seed, and herb seed. Among the other plant propaguels are corms, tubers, bulbs, and rhizomes. Besides the plants specified above other plant seed and propagules would fall within the scope of this invention In the following examples corn and soybean seeds were treated with a variety of doses of UV-C light in the range of 0.25-480 $kJ/M^2$. The two hybrids of corn and the one inbred of corn were planted on May 17, 2008. The hybrids were planted in 6 replicated blocks at one location and the inbred was planted in two replicated blocks at one location. The sowing seeds were planted in thirty-inch rows on ground prepared following conventional tillage practices. The prior year crop on this ground was soybeans. The ground was located in Morgan County, Ill. The seed was harvested on Oct. 17, 2008.

The three varieties of soybeans were planted on May 17, 2008. The varieties were planted in 3 replicated blocks at one location. The sowing seeds were planted in thirty-inch rows on ground prepared following conventional tillage practices. The prior year crop on this ground was soybeans. The ground was located in Cass County, Ill. The seed was harvested on Oct. 14, 2008.

It was found that certain selected doses of UV-C light (within the range of 0.25-480 $kJ/M^2$) when applied to sowing seed were effective in enhancing the yield of both harvested corn and harvested soybean seeds, as shown in the following Examples 1-6:

Example 1

The following table shows the enhanced harvested corn kernel yield of two sowing corn seed hybrids that resulted from three different treatments of UV-C light coupled with an additional chemical treatment of Maxim XL, Apron XL, and Trilex before planting.

| Corn With Chemical Over-treatment | UV-C Treated Avg. Yield Bu./acre | Control Avg. Yield Bu./acre | Difference Bu./acre | Difference Percent |
|---|---|---|---|---|
| Hybrid #1 | 227.9 | 216.8 | 11.1 | 5.1% |
| Hybrid #2 | 222.5 | 211.1 | 11.4 | 5.4% |
| Average | 225.2 | 214.0 | 11.2 | 5.3% |

Example 2

The following table shows the enhanced harvested corn kernel yield of a corn inbred treated with a selected treatment of UV-C light and then over-treated with Maxim XL, Apron XL, and Trilex before planting.

| Corn With Chemical Over-treatment | UV-C Treated Avg. Yield Bu./acre | Control Avg. Yield Bu./acre | Difference Bu./acre | Difference Percent |
|---|---|---|---|---|
| Inbred #1 | 132.6 | 119.4 | 13.2 | 11.1% |

Example 3

The following table shows the harvested soybean seed yield of three soybean varieties that were each treated with the same seven different selected treatments of UV-C light before planting. The UV-C light treated sowing seeds were not over-treated.

| Soybean No Chemical Over-treatment | UV-C Treated Avg. Yield Bu./acre | Control Avg. Yield Bu./acre | Difference Bu./acre | Difference Percent |
|---|---|---|---|---|
| Variety #1 | 65.4 | 66.2 | −0.8 | −1.2% |
| Variety #2 | 64.3 | 60.3 | 4.0 | 6.6% |
| Variety #3 | 61.9 | 64.1 | −2.2 | −3.4% |
| Average | 63.9 | 63.5 | 0.4 | 0.6% |

Example 4

The following table shows the harvested soybean seed yield of three soybean varieties. The yield shown is the average of the three best of seven treatments as measured by yield of harvested seed. The UV-C light treated sowing seeds were not over-treated.

| Soybean No Chemical Over-treatment 3 Best Treatments | UV-C Treatments | UV-C Treated Avg. Yield Bu./acre | Control Avg. Yield Bu./acre | Difference Bu./acre | Difference Percent |
|---|---|---|---|---|---|
| Variety #1 | S, X1, X3 | 66.9 | 66.2 | 0.7 | 1.1% |
| Variety #2 | E, S, T | 66.2 | 60.3 | 5.9 | 9.8% |
| Variety #3 | R, T, X3 | 64.8 | 64.1 | 0.7 | 1.1% |
| Average | | 66.0 | 63.5 | 2.5 | 3.9% |

Example 5

The following table shows the harvested soybean seed yield of three soybean varieties that were each treated with the same seven different selected treatments of UV-C light and then over-treated with Apron Maxx before planting.

| Soybean With Chemical Over-treatment | UV-C Treated Avg. Yield Bu./acre | Control Avg. Yield Bu./acre | Difference Bu./acre | Difference Percent |
|---|---|---|---|---|
| Variety #1 | 65.3 | 63.5 | 1.8 | 2.8% |
| Variety #2 | 64.1 | 61.0 | 3.1 | 5.1% |
| Variety #3 | 64.0 | 62.5 | 1.5 | 2.4% |
| Average | 64.5 | 62.3 | 2.2 | 3.5% |

Example 6

The following table shows the harvested soybean seed yield of three soybean varieties. The yield shown is the average of the three best of seven treatments as measured by yield of harvested seed. The UV-C light treated sowing seeds were over-treated with Apron Maxx before planting.

| Soybean With Chemical Over-treatment 3 Best Treatments | UV-C Treatments | UV-C Treated Avg. Yield Bu./acre | Control Avg. Yield Bu./acre | Difference Bu./acre | Difference Percent |
|---|---|---|---|---|---|
| Variety #1 | X2, T, X3 | 67.5 | 63.5 | 4.0 | 6.3% |
| Variety #2 | X2, R, T | 66.6 | 61.0 | 5.6 | 9.2% |
| Variety #3 | X2, R, E | 66.9 | 62.5 | 4.4 | 7.0% |
| Average | | 67.0 | 62.3 | 4.7 | 7.5% |

We claim:
1. A method of enhancing the yield of harvested plant seeds comprising the application of a physical plant stressor to plant sowing seeds wherein the said physical plant stressor applied is UV-C light in selected doses from within a range of 0.25-480 kJ/M.sup.2 and wherein the plant providing the sowing seeds is a crop plant selected from the group of plants consisting of soybean and corn.

* * * * *